United States Patent Office 3,227,881
Patented Jan. 4, 1966

3,227,881
CORROSION MONITORING BY
ACTIVATION ANALYSIS
Benjamin E. Gordon, Concord, Calif., assignor to Shell Oil Company, New York, N.Y., a corporation of Delaware
No Drawing. Filed Oct. 15, 1962, Ser. No. 230,745
5 Claims. (Cl. 250—106)

This invention relates to a process for monitoring and controlling the corrosion of materials exposed to fluid streams at inaccessible locations. More particularly, the invention is directed to the use of tracers to monitor the corrosion of down-hole equipment used in petroleum wells. The invention has particular application to the control of corrosion inhibitor "squeezes" in producing formations surrounding operating wells.

Due to the nature of the corrosion mechanism, it has been found that corrosion rates and the effectiveness of corrosion inhibitors can be best determined by exposing the corrodible material to be tested to the corrosive environment in which the material is to be used. Although various techniques may be used to observe corrosion rates, most techniques rely on weight-loss determinations of a specimen of the corroded material being tested. When used at inaccessible locations, such as down-hole positions in producing wells, these techniques have the obvious disadvantage that test specimens may not be readily retrieved for the weight-loss determination.

Because of the shortcomings of the weight-loss techniques, processes using tracer type corrosion monitoring techniques have been developed. Typically, tracer techniques rely on the escape and detection of a dye, chemical, or radioactive material upon the termination of predetermined degree of corrosion. Processes using these techniques have the advantage that the detection may be accomplished at a position remote from the location of corrosion, since the tracer may be carried in a fluid stream exposed to the corrodible material. These processes have the disadvantage, however, that they merely indicate the point at which a predetermined degree of corrosion has taken place. After this point, or points, the tracer no longer serves as an indication of the degree at which further or continued corrosion is occurring. Thus, the use of such tracer techniques in the continuous monitoring of corrosion requires that the tracer be replenished at intervals corresponding to the time intervals at which the tracers indicate a predetermined amount of corrosion. Such replenishment has the disadvantage that it interrupts the continuous monitoring of corrosion, and that it is difficult and time consuming in cases where the area of corrosion determination is not readily accessible.

In order to overcome the disadvantages of the abovementioned tracer processes, continuous-type radioactive tracer processes have been recently developed. For example, copending application Serial No. 203,958, filed June 20, 1962 and entitled "Process and Apparatus for Monitoring and Controlling Rates," discloses a process for continuously monitoring corrosion in a production string through means of a corrodible radioactive specimen disposed in the string. The process has the advantage that the radioactive specimen may be incorporated into the production string as a section thereof and that effluent removed from the string may be continuously monitored to detect the amount of radioactive tracer therein, which may in turn be correlated to the degree of corrosion in the production string. This process has the disadvantage, however, that the radioactive tracer specimen is fabricated of a "hot" radioactive material that requires special handling and may prove hazardous to well-operating personnel. Specifically, in handling the radioactive tracer specimen of the copending application, it is required that the personnel who install the tracer in the well be approved by the Atomic Energy Commission. Furthermore, this process is expensive to fabricate and, of course, expensive to handle. For example, it has been found that the fabrication of a six-inch radioactive specimen, as used in the copending application, may cost as much as $1,800. Handling of such specimens proves expensive both because of the trained personnel required and because of the protective measures, such as lead containers, required for transportation and handling of the specimen.

In addition to the above-enumerated disadvantages encountered with the use of radioactive tracers, there are also situations in which the presence of radioactive material, even in very low concentrations, in the stream being monitored is undesirable. Such situations may arise where the stream is effluent from a producing petroleum well which is being processed in a refinery. If, in this situation, extremely large volumes are being produced there is the possibility that the Atomic Energy Commission regulations may require continual refinery inspections in order to detect the presence of dangerous accumulations of radioactive material.

Tracers have also been incorporated into corrosion inhibitors to monitor the concentration of the inhibitors and, thus to some degree, control the rate of corrosion. Although this use serves as an accurate indication of the concentration of the corrosion inhibitor, it does not necessarily yield a meaningful determination of the corrosion rate of a corrodible material exposed to the inhibitor. For example, in an environment of mildly corrosive conditions, the absence or low concentration of an inhibitor in the environment would not necessarily indicate a high rate of corrosion. Likewise, in a very corrosive environment, the presence of a corrosion inhibitor would not necessarily indicate a low rate of corrosion.

The present invention is directed to a process to overcome the shortcomings of aforedescribed corrosion indicating techniques. The invention is particularly designed for use in the boreholes of wells traversing fluid-producing geological formations. It is noted that the heterogeneous conditions existing in such boreholes necessitate accurate corrosion information in order to facilitate the proper design of equipment, such as casing strings, producing strings, and pumps, to be used during operation of the well. Furthermore, under these conditions, it is most useful to ascertain whether and when chemical inhibition techniques should be initiated and resumed.

The present invention is particularly valuable in that it has the advantages of the recently developed continuous monitoring processes utilizing radioactive tracers, while it avoids the disadvantages accompanying these processes. Specifically, the invention avoids the handling and accumulation hazards presented by radioactive tracer specimens and also the relatively high expense involved in the manufacture and use of such specimens. Furthermore, the invention has the advantage that it may utilize tracer specimens extending over large areas desired to be monitored, and thus minimizes the possibility of erroneous monitoring due to concentrated corrosion in an area remote from the tracer specimen. The advantages of the present invention are accomplished by utilizing a tracer specimen fabricated of the material to be monitored and having incorporated therein a small amount of material capable of being analyzed by activation analysis.

It is, therefore, a primary object of the invention to provide a process for monitoring the corrosion of materials disposed at inaccessible locations.

Another object of the invention is to provide a process to facilitate the timely introduction and proper utilization of corrosion inhibitors into inaccessible corrosive environments.

A further object of the invention is to provide a process for utilizing a tracer subject to activation analysis for detecting the rate of corrosion of working elements disposed within a fluid producing well.

Another object of the invention is to provide a process for monitoring corrosion over an extended area whereby the possibility of inaccuracies due to corrosion in concentrated areas is minimized.

Another and more specific object of the invention is to provide a corrosion monitoring process to detect corrosion over long periods of time through means of activation analysis while avoiding the hazards, expenses and inconveniences accompanying the use of present processes utilizing radioactive tracers.

Yet another object of the invention is to avoid the presence of radioactive material in fluid streams exposed to the material being monitored for corrosion.

The above and other objects of the invention will become apparent from the following description and illustrative example.

Basically, the process of the present invention is directed to a method of monitoring the corrosion of corrosion sensitive material exposed to a fluid stream. The process includes incorporating a minor portion of a material capable of being activated to a relatively high intensity of radioactivity into a specimen having corrosion characteristics corresponding to those of the material being monitored. Preferably, the minor portion of the material in the specimen is of a type not normally present in the fluid stream. After the specimen is fabricated, it is placed in the fluid stream and the stream is sampled by activation analysis to determine the amount of said minor portion of material therein. The minor portion determined by the analysis is then correlated with the degree of corrosion of the corrosion sensitive material, and thus serves as an accurate indication of the corrosive state of the material being monitored. The analysis may be carried out continuously or repeated periodically at any desired frequency to determine the rate of corrosion in the material being monitored. Information obtained through this monitoring process may, in turn, be utilized to control corrosion through the use of corrosion inhibitors and/or other corrosion controlling devices.

In the application of the process of the present invention to the monitoring of corrosion in petroleum producing wells, a minor portion of tracer material capable of being activated to a relatively high intensity of radioactivity is incorporated into a component of the well exposed to effluent being removed from the well. Typically, the component into which the tracer material is incorporated may take the form of a relatively long (e.g., 100 feet) production string disposed at a considerable depth within the well. The use of such a long length of production string has the advantage that the area of the tracer material exposed to the well effluent is likely to be representative of the environment in the producing well and, thus inaccuracies which result in processes utilizing relatively small and often isolated specimens are avoided. The tracer material used in the present invention and the component incorporating this material is well adapted for use in such large specimens, since the material is never in a radioactive state at the time it is incorporated in the specimen and utilized in the producing well. Because of the inactive state of the tracer material in the specimen, the size or mass of the specimen need not be maintained at a minimum in order to avoid the hazards encountered in the handling of large masses of radioactive material.

As enumerated in the aforerecited advantages of this invention, the non-radioactive tracer material and specimen also have the advantage that the cost of manufacturing and handling of the specimen is considerably less than corresponding costs encountered in the use of radioactive specimens. Although the tracer material in the monitoring specimen of the present invention is not radioactive at the time it is incorporated into the specimen and used in the producing well, the material must be capable of being made radioactive in order that its presence in the well effluent may be detected by activation analysis. It is through activation analysis of the well effluent and correlation of this analysis with the rate of corrosion of the working components of the well, as will be developed subsequently, that the present process it utilized for the monitoring of corrosion.

Briefly, activation analysis is an analyzing process whereby the presence and concentration of elements subject to being made radioactive may be determined. Typically, in application of the process a sample of material to be analyzed is first subjected to a relatively high neutron flux, for example $1 \times 10^{13}$ n./sec. cm.$^2$ for a period of one hour. After the sample has been subjected to the neutron flux, the elements therein having high neutron capture characteristics are made radioactive and may be detected by conventional radiation detection apparatus. Accurate detection of the presence and determination of the concentration of specific radioactive elements can be effected through use of a gamma ray spectrometer. Such an instrument resolves and determines the amount of isotopes in accordance with gamma ray energy, half life and intensity and thus serves as an accurate analyzing tool for detecting the concentration of radioactive elements. Detection may also be achieved by measuring the energy and intensity of the beta radiation from such isotopes. It is noted that the sensitivity of the analysis may be increased by increasing the intensity of the neutron flux to which the sample is initially subjected. Furthermore, should the radioactivity of an irradiated sample decay to a point where radiation analysis is no longer feasible, the sample may be irradiated successive times and reanalyzed. The latter step often becomes necessary where insufficient data is obtained from the original analysis.

In activation analysis, elements with relatively short half-lives, of for example one hour or less, are most easily and rapidly detected since they emit more counts per unit time than the longer half-life isotopes. Elements having relatively long half-lives, ranging in days or even years, are on the contrary more difficult to analyze, since the time required for counting during the analysis is relatively long. However, the detection of elements having relatively long half-lives has the advantage that interfering radioactive elements having shorter half-lives may be permitted to decay away before the analysis is commenced. Although this method of avoiding interference by extraneous elements may often be effectively used when analyzing elements having a substantially long half-life, there are occasions where this method of isolation proves ineffective due to either the long half-life of the extraneous elements or the relatively short half-life of the element desired to be analyzed. In this case, it is often desirable to separate the interfering extraneous elements from the element desired to be analyzed by chemical separation either before or after irradiation of the sample. For example, under proper conditions, ion-exchange could feasibly be used to readily separate all monovalent and divalent elements from the trivalent rare earths.

Reference is now made to the application of the activation analysis method to the process of the present invention wherein a tracer material or element is detected by activation analysis. In this application, the tracer material incorporated into the aforedescribed specimen, which specimen may be formed as a section of production string, is an element capable of being activated to a relatively high intensity of radioactivity. Preferably, the element should be readily alloyed with steel by means conventionally practiced in the metallurgical arts and should be limited to amounts which will not alter the corrosion characteristics of the specimen of production string into which it is incorporated. The element should also be of a type not naturally present in the well effluent derived from the formation being produced, since the natural presence of the element in the well effluent would render detection of the element for monitoring purposes essentially useless. Furthermore, when using the above-described method of activation analysis utilizing neutron bombardment, the element should be of a type having high neutron capture characteristics (i.e., "high cross section") in order that it might be readily activated by being subjected to a neutron flux of, for example, $1 \times 10^8$ n./sec. cm.$^2$ to $1 \times 10^{12}$ n./sec. cm.$^2$ for a period of one hour. It is also necessary that the element be of a type easily analyzed by activation analysis in extremely low concentrations ranging in parts per million to parts per billion. In order to facilitate relatively rapid analysis it is generally desirable that the element have a short half-life measuring in periods of several hours. The latter characteristic is desirable since it makes counting more sensitive and rapid due to the high decay rate of the element. However, it is noted that effluent conditions may be encountered wherein extraneous elements having relatively short half-lives are present which interfere with the detection of the tracer element. In this case, it may be desirable to use a tracer element having a relatively long half-life in order that the extraneous elements may be permitted to decay to a point where they will not interfere with activation analysis before the analysis is commenced.

Elements suitable for use as tracer materials with the process of the present invention include dysprosium, lutecium, holmium and europium of the rare-earth family of elements. These rare-earths are particularly well suited for use as tracer elements in the present invention in that they are quite uncommon and, therefore, unlikely to be present to any appreciable extent in the well effluent of petroleum wells. In addition to the rare-earths, indium and cobalt are well adapted for use as tracer materials with the process of the invention. Although both the rare earths and the latter elements are detectable in very small concentrations by activation analysis, indium and cobalt have proved to be particularly susceptible to detection in the parts per billion range. It is to be understood that the process of the present invention is not intended to be limited to use with the specifically enumerated tracer elements, but rather includes any element having the aforementioned characteristics required to facilitate effective activation analysis. The specific element used in a tracer specimen is selected in light of the elements naturally present in the effluent of the well in which the specimen is to be used. The elements naturally present in the well effluent may be determined by any means well known in the art, such as by producing from the well and running a chemical analysis of the produced effluent. Such an analysis may even include an activation analysis to determine the degree to which extraneous elements in the well effluent will possibly interfere with the activation analysis monitoring process of the invention. From the information obtained in the latter analysis, it may be found desirable to utilize an element as a tracer material which has a substantially long half-life in order to avoid extraneous element interference by permitting extraneous elements to decay prior to activation analysis.

The process of the present invention will now be exemplified with reference to a specific application wherein it is desired to monitor and control the corrosion rate of the production string in a producing petroleum well. Initially, it will be assumed that the well was in producing service before the application of the process. In such a situation, analysis of the effluent from the well in its natural state may easily be effected by removing a sample produced from the well and analyzing this sample by both chemical and activation methods. From this analysis it will be assumed that the natural state of the effluent contained no cobalt, but did include interfering extraneous elements having relatively short half-lives of a few hours or possibly even several days. With this information, and in light of the foregoing description of the invention, the use of cobalt as a tracer element appears ideal. Therefore, a monitoring specimen in the form of a length of production string having cobalt incorporated therein will be prepared for use as a section of the production string.

Specifically, the monitoring specimen is prepared by alloying a small percentage of cobalt into a steel specimen corresponding to the material of the production string being used in the well. Ideally, the amount of cobalt incorporated into the specimen is something less than or up to 1% in order that the corrosion characteristics of the specimen will not differ from those of the standard production strings being used. It is noted that large percentages of cobalt incorporated into steel tend to alter the corrosion characteristics of the steel. Incorporation of the cobalt into the specimen may be carried out by any of the means well known to those skilled in the metallurgical arts. Upon completion of the alloying, the specimen is fabricated into a tubular section corresponding to the tubular sections of the production string, including threaded ends adapted to be coupled to sections of the production string. Fabrication may be accomplished by any of the methods well known to those skilled in the metal working arts.

After preparation of the tubular specimen, it is assembled into the production string as a section thereof and preferably at a location where it will be subjected to the most adverse corrosive conditions when the string is lowered into the well. At this point, it is noted that the cobalt incorporated into the specimen is of the inactive cobalt 59 form and thus presents no hazard to those handling the specimen in its manufacture or application to the production string. With the tubular specimen assembled into the production string, the string is lowered into the producing well and petroleum effluent is removed therefrom in the conventional manner. Periodically, samples of this effluent are removed and analyzed by activation analysis, as described supra. In this analysis, the sample would first be subjected to a neutron flux of $1 \times 10^{12}$ n./sec. cm.$^2$ for a period of 60 minutes. Subjecting the sample to this neutron flux will activate some cobalt 59 therein to radioactive cobalt 60 and will also activate some extraneous elements naturally present in the effluent to their radioactive form. However, since cobalt 60 has a half-life of approximately 5.2 years, and since the aforementioned analysis of the effluent indicated that the extraneous elements naturally present therein have short half-lives measuring in hours, interference by the radioactive extraneous elements may be avoided by permitting these elements to decay prior to activation analysis. After the irradiated sample has been set aside for a period sufficient to permit the extraneous elements to decay away, analysis to determine the amount of cobalt in the sample is carried out by a gamma ray spectrometer capable of resolving the isotopes in the specimen in accordance with gamma ray energy, half-life, and intensity. This analysis serves as an accurate indication of the amount of cobalt present in the sample, which in turn may be correlated to the degree of corrosion of the production string being monitored. It is noted that the cobalt in the sample of effluent is necessarily the result of corrosion of the specimen section, since cobalt was shown not to be naturally present in the well effluent. Therefore, and since the specimen has a corrosion rate corresponding to that of the production string, correlation of the rate of corrosion of the production string with the amount of cobalt in the effluent sample may be determined by the total weight of cobalt in the effluent in a given period of time.

In the above example, the information obtained from the monitoring process may be used to determine when well components, such as the production string, should be replaced. This information is also of value to control the application of corrosion inhibitors to the producing well.

Specifically, the information may be utilized to control inhibitor "squeezes" into the producing formation or formations of the well. Typically, such "squeezes" may utilize nitrogen-containing corrosion inhibitors introduced into the formation through a process of reversed production within the well.

From the foregoing description, it is believed apparent that the present invention provides a process whereby the corrosion of materials exposed to a fluid stream may be monitored and controlled. The description is, however, merely intended to be explanatory of the invention. Various changes in the details of the described process may be made, within the scope of the appended claims, without departing from the spirit of the invention. For example, although the invention has been described primarily with reference to its application to monitoring corrosion of producing well string, it is anticipated that the invention may be equally well applied to other conduits in varying environments. Furthermore, although the specific example suggests avoiding interference of extraneous elements by permitting these elements to decay prior to activation analysis, it is anticipated that such extraneous elements could also be avoided by simple chemical separation, as described with reference to the brief description of activation analysis. For example, under proper conditions, ion-exchange could be used to readily separate all monovalent and divalent elements from the trivalent rare earths.

I claim as my invention:

1. A process for monitoring the corrosion of a corrosion-sensitive conduit having fluid flowing therethrough, said process comprising:
   (a) incorporating up to 1% by weight of a material foreign to said conduit and capable of being activated to a relatively high intensity of radioactivity into a specimen having corrosion characteristics corresponding to said conduit being monitored, said material being of a type not normally present in the fluid flowing through said conduit;
   (b) fabricating said specimen into a tubular section having cross-sectional dimensions substantially equal to the cross-sectional dimensions of said conduit and being adapted to be integrated into said conduit as a section thereof;
   (c) integrating said tubular section into said conduit as a section thereof;
   (d) collecting samples of said fluid flowing through said conduit with said tubular section; and
   (e) subjecting said samples to activation analysis to determine the amount of said material in said fluid which is proportional to the corrosion rate of said conduit and from which the rate of corrosion of said conduit being monitored can be determined.

2. A process for monitoring the corrosion of the corrosion-sensitive conduit having fluid flowing therethrough, said process comprising:
   (a) incorporating up to 1% by weight of a non-radioactive material foreign to said conduit and having a high neutron captured characteristics into a specimen having corrosion characteristics corresponding to said conduit being monitored, said material being of the type not normally present in the fluid flowing through said conduit;
   (b) fabricating said specimen into a tubular section having cross-sectional dimensions substantially equal to cross-sectional dimensions of said conduit and being adapted to be integrated into said conduit as a section thereof;
   (c) integrating said tubular section into said conduit as as section thereof;
   (d) collecting samples of said fluid flowing through said conduit with said tubular section integrated therein;
   (e) subjecting said samples to a relatively high neutron flux; and
   (f) determining the amount of said material in said samples by gamma ray spectrometry which amount is proportional to the corrosion rate of said conduit and from the corrosion rate of said conduit in the vicinity of said tubular section can be determined.

3. A process for controlling the rate of corrosion in a corrosion sensitive conduit having a fluid effluent flowing therethrough from a producing well, said process comprising:
   (a) incorporating up to 1% by weight of a material foreign to said conduit and capable of being activated to a relatively high intensity of radioactivity into a specimen having corrosion characteristics corresponding to said conduit being monitored, said material being of the type not normally present in said fluid effluent;
   (b) exposing said specimen to said fluid effluent flowing through said conduit;
   (c) collecting samples of said fluid effluent exposed to said specimen and said conduit;
   (d) subjecting said samples to activation analysis to determine the amount of said material in said fluid effluent exposed to said specimen and said conduit and which amount is proportional to the corrosion rate of said conduit; and
   (e) introducing a corrosion inhibitor into said fluid effluent upstream of said specimen to maintain the amount of said material in said fluid effluent exposed to said specimen below a predetermined level.

4. A process for monitoring the corrosion of a corrosion sensitive material exposed to a fluid stream, said process comprising:
   (a) incorporating up to 1% by weight of a second material foreign to said material to be monitored and capable of being activated to a relatively high intensity of radioactivity and having a substantially long half-life into a specimen having corrosion characteristics corresponding to those of said material being monitored, said second material being of the type not normally present in said fluid stream;
   (b) exposing said specimen to said fluid stream by contacting it with said fluid stream;
   (c) collecting samples of said fluid stream exposed to said specimen;
   (d) subjecting said samples to a high neutron flux;
   (e) permitting irradiated extraneous materials normally present in said samples and having half-lives shorter than said second material to decay; and
   (f) thereafter determining the amount of said second material in said sample by gamma ray spectrometry which amount is proportional to the corrosion rate of said material to be monitored and from which said corrosion rate can be determined.

5. A process for monitoring the corrosion of a corrosion sensitive material exposed to a fluid stream, said process comprising:
   (a) incorporating up to 1% by weight of a second material foreign to said material to be monitored and capable of being activated to a relatively high intensity of radioactivity into a specimen having corrosion characteristics corresponding to said material being monitored, said second material being of the type not normally present in said fluid stream;
   (b) exposing said specimen to contact with said fluid stream;
   (c) collecting samples from said fluid stream exposed to said specimen;
   (d) chemically separating from said samples materials which would interfer with activation analysis of said second material in said sample; and
   (e) determining the amount of said second material in said samples by activation analysis, said amount being proportional to the corrosion rate of said material monitored.

(References on following page)

References Cited by the Examiner

UNITED STATES PATENTS

| | | | |
|---|---|---|---|
| 2,751,506 | 6/1956 | Black | 250—106 |
| 2,994,778 | 8/1961 | Marsh | 250—106 |
| 3,002,091 | 9/1961 | Armstrong | 250—106 |
| 3,019,341 | 1/1962 | Monaghan | 250—106 |
| 3,128,381 | 4/1964 | Moriey et al. | 250—106 |
| 3,144,559 | 8/1964 | Forrester et al. | 250—43.5 |

RALPH G. NILSON, *Primary Examiner.*

JAMES W. LAWRENCE, *Examiner.*